(12) United States Patent
Yang et al.

(10) Patent No.: US 10,957,903 B2
(45) Date of Patent: Mar. 23, 2021

(54) LAYERED LITHIUM-RICH MANGANESE-BASED CATHODE MATERIAL WITH OLIVINE STRUCTURED LIMPO4 SURFACE MODIFICATION AND PREPARATION METHOD THEREOF

(71) Applicant: SOUTH CHINA UNIVERSITY OF TECHNOLOGY, Guangdong (CN)

(72) Inventors: Chenghao Yang, Guangdong (CN); Fenghua Zheng, Guangdong (CN); Xunhui Xiong, Guangdong (CN); Meilin Liu, Guangdong (CN)

(73) Assignee: SOUTH CHINA UNIVERSITY OF TECHNOLOGY, Guangdong (CN)

( * ) Notice: Subject to any disclaimer, the term of this patent is extended or adjusted under 35 U.S.C. 154(b) by 380 days.

(21) Appl. No.: 16/088,830

(22) PCT Filed: Dec. 8, 2016

(86) PCT No.: PCT/CN2016/109096
§ 371 (c)(1),
(2) Date: Sep. 27, 2018

(87) PCT Pub. No.: WO2017/166863
PCT Pub. Date: Oct. 5, 2017

(65) Prior Publication Data
US 2020/0328406 A1    Oct. 15, 2020

(30) Foreign Application Priority Data
Mar. 27, 2016   (CN) .......................... 201610186339.4

(51) Int. Cl.
*H01M 4/36* (2006.01)
*C01G 53/00* (2006.01)
(Continued)

(52) U.S. Cl.
CPC ............ *H01M 4/366* (2013.01); *C01G 53/50* (2013.01); *H01M 4/505* (2013.01); *H01M 4/525* (2013.01);
(Continued)

(58) Field of Classification Search
None
See application file for complete search history.

(56) References Cited

U.S. PATENT DOCUMENTS

| | | | | |
|---|---|---|---|---|
| 9,065,115 B2* | 6/2015 | Chen | ...................... | H01M 4/625 |
| 2012/0263998 A1* | 10/2012 | Thackeray | ............ | H01M 4/131 |
| | | | | 429/156 |

(Continued)

FOREIGN PATENT DOCUMENTS

| | | | | |
|---|---|---|---|---|
| CN | 103035906 | * | 4/2013 | ........ H01M 10/0525 |
| CN | 103682304 | | 3/2014 | |

(Continued)

OTHER PUBLICATIONS

Wang et al., High capacity double-layer surface modified Li[Li0.2Mn0.54Ni0.13Co0.13]O2 cathode with improved rate capability, Jun. 5, 2009, Journal of Materials Chemistry, www.rsc.org/materials. (Year: 2009).*

(Continued)

*Primary Examiner* — Rena Dye Cronin
(74) *Attorney, Agent, or Firm* — JCIPRNET (57) ABSTRACT

The present invention provides a layered lithium-rich manganese-based cathode material with olivine structured $LiMPO_4$ surface modification and a preparation method thereof. The preparation method comprises: firstly, preparing a pure-phase layered lithium-rich manganese-based cathode material by using a coprecipitation method and a high temperature sintering method, and then uniformly coating and doping olivine-structured $LiMPO_4$ to the surface (Continued)

of the layered lithium-manganese-rich composite cathode material by using a sol-gel method. According to the present invention, the surface of the layered lithium-rich manganese-based cathode material is modified by olivine structured $LiMPO_4$, such that cycle stability thereof is effectively improved, and voltage drop generated by the material in the cycle course is inhibited. The preparation method according to the present invention is simple, low cost, environmentally friendly, and is suitable for large-scale industrial production.

18 Claims, 3 Drawing Sheets

(51) Int. Cl.
| | | |
|---|---|---|
| *H01M 4/505* | (2010.01) | |
| *H01M 4/525* | (2010.01) | |
| *H01M 4/58* | (2010.01) | |
| *H01M 4/02* | (2006.01) | |
| *H01M 10/0525* | (2010.01) | |

(52) U.S. Cl.
CPC ..... *H01M 4/5825* (2013.01); *H01M 10/0525* (2013.01); *C01P 2002/50* (2013.01); *C01P 2002/72* (2013.01); *C01P 2004/03* (2013.01); *C01P 2004/80* (2013.01); *C01P 2006/40* (2013.01); *H01M 2004/028* (2013.01)

(56) References Cited

U.S. PATENT DOCUMENTS

| | | | |
|---|---|---|---|
| 2014/0045067 A1* | 2/2014 | Cho | C01G 45/1228 429/220 |
| 2014/0099540 A1* | 4/2014 | Chen | C01G 53/04 429/211 |
| 2014/0255603 A1* | 9/2014 | Xiao | H01M 4/366 427/213.3 |
| 2018/0097225 A1* | 4/2018 | Yamaya | H01M 4/661 |
| 2018/0226631 A1* | 8/2018 | Paulsen | C01G 51/42 |
| 2018/0277887 A1* | 9/2018 | Yasumiishi | H01M 4/5825 |

FOREIGN PATENT DOCUMENTS

| | | |
|---|---|---|
| CN | 105304855 | 2/2016 |
| CN | 105742622 | 7/2016 |

OTHER PUBLICATIONS

"International Search Report (Form PCT/ISA/210)", dated Mar. 2, 2017, with English translation thereof, pp. 1-4.

* cited by examiner

LAYERED LITHIUM-RICH MANGANESE-BASED CATHODE MATERIAL WITH OLIVINE STRUCTURED LIMPO4 SURFACE MODIFICATION AND PREPARATION METHOD THEREOF

CROSS-REFERENCE TO RELATED APPLICATION

This application is a 371 application of an international PCT application serial no. PCT/CN2016/109096, filed on Dec. 8, 2016, which claims priority benefit of Chinese Application No. 201610186339.4, filed on Mar. 27, 2016. The entirety of each of the above-mentioned patent applications is hereby incorporated by reference herein and made a part of this specification.

BACKGROUND OF THE INVENTION

1. Technical Field

The present invention relates to the technical field of preparations of electrode materials for lithium ion batteries, and in particular, relates to a layered lithium-rich manganese-based cathode material with olivine structured $LiMPO_4$ (M=Ni, Co, Mn, Fe, Cu, Al, Mo, Mg) surface modification and a preparation method thereof.

2. Description of Related Art

Lithium ion batteries have the advantages of high energy density, small self-discharge, good safety performance and the like, and are thus extensively applied as mobile phone batteries, laptop computer batteries, mobile power sources and batteries of the like portable electronic products. In recent years, how to further improve the energy density of the lithium ion battery is critical to promotion of the extensive application of the lithium ion battery in fields of electric vehicles and hybrid vehicles. Relative to anode materials, cathode materials have a low specific capacity, which is an important factor hindering acquisition of high energy density and further development of the lithium ion battery. Therefore, research and improvement on the cathode material are important to the development of the lithium battery. At present, commercially available cathode materials mainly include layered $LiCoO_2$ and ternary materials, spinel-structured $LiMn_2O_4$, olivine-structured $LiFePO_4$ and the like. However, these cathode materials have a low practical specific capacity, which is below 200 mAh/g. In recent years, layered lithium-rich manganese-based cathode materials are significantly concerned due to its specific capacity over 250 mAh/g and a high operating voltage of 4.8 V. However, layered lithium-rich manganese-based cathode materials have the disadvantages of poor magnification performance, specific capacity attenuation and voltage drop generated in a cycle course, and the like. Specific capacity attenuation and voltage drop generated by the layered lithium-rich manganese-based cathode material in the cycle course are mainly caused by two factors. One is that an electrolyte is reacted with the lithium-manganese-rich material per se, which causes loss of active substances. The other is that the layered lithium-manganese-rich material may transition to the spinel structure in the cycle course, and thus the layered structure is destroyed and a $Li^+$ diffusion channel is blocked.

Studies have found that there are mainly two methods, bulk doping and surface coating, for improving the cycle performance and magnification performance of the layered lithium-manganese-rich material. The bulk doping refers to replacing a portion of ions in the body of the layered lithium-rich manganese-based cathode material with metal ions ($Al^{3+}$, $Ti^{4+}$, $Fe^{2+}$ or the like), to thus stabilize the structure of the material, and improve cycle stability and inhibit voltage drop. The surface coating refers to coating a nano-scale protective film layer on the surface of the lithium-rich manganese-based cathode material, such that the lithium-rich manganese-based cathode material is prevented from being in direct contact with the electrolyte and reacting with the electrolyte, to improve the cycle stability and inhibit the voltage drop of the lithium-rich manganese-based cathode material.

SUMMARY OF THE INVENTION

The present invention provides a layered lithium-rich manganese-based cathode material with olivine structured $LiMPO_4$ (M=Ni, Co, Mn, Fe, Cu, Mo, Mg) surface modification and a preparation method thereof. The preparation method is simple and easy to operate, which may effectively improve structural stability of the layered lithium-rich manganese-based cathode material, improve cycle performance thereof and inhibit voltage drop in the cycle course.

The preparation method of the layered lithium-rich manganese-based cathode material with olivine structured $LiMPO_4$ (M=Ni, Co, Mn, Fe, Cu, Mo, Mg) surface modification according to the present invention comprises: preparing a pure-phase layered lithium-rich manganese-based cathode material by using a coprecipitation method, and modifying the surface of the pure-phase layered lithium-rich manganese-based cathode material by using the olivine structured $LiMPO_4$ (M=Ni, Co, Mn, Fe, Cu, Mo, Mg). In addition, based on mass fraction, an olivine structured $LiMPO_4$ (M=Ni, Co, Mn, Fe, Cu, Al, Mo, Mg) coating layer accounts for a mass fraction of 1% to 10%, and the lithium-rich material accounts for a mass fraction of 90-99%.

The objectives of the present invention are implemented by employing the following technical solutions:

A preparation method of a layered lithium-rich manganese-based cathode material with olivine structured $LiMPO_4$ surface modification is provided. The preparation method comprises the following steps:

1) weighing a nickel salt, a cobalt salt and a manganese salt and respectively dissolving these salts into deionized water to formulate salt solutions having a concentration of 0.5-2 mol/L, wherein the nickel salt, the cobalt salt and the manganese salt are weighed based on a molar ratio of Ni to Co to Mn in a chemical formula of $Li_{1.2}Mn_xNi_yCo_{0.8-x-y}O_2$, where $0.4 \leq x \leq 0.6$, $0.1 \leq y \leq 0.2$;

2) dissolving alkali and ammonia water in the deionized water to formulate a mixed alkali solution, wherein the alkali has a concentration of 2-10 mol/L, and the ammonia water has a molar concentration of 2-5 mol/L;

3) adding the mixed alkali solution obtained in step 2) into a reactor, wherein a volume of the mixed alkali solution accounts for 30% to 50% of the volume of the reactor, controlling a pH value between 9 and 12, and controlling a temperature between 60° C. and 80° C.;

4) respectively adding the solutions of the nickel salt, the cobalt salt and the manganese salt formulated in step 1) into the reactor via a peristaltic pump at a constant speed, wherein during the entire process, the pH value is between 9 and 12, and the temperature is between 60° C. and 80° C.;

5) upon adding the solutions of the nickel salt, the cobalt salt and the manganese salt, standing still and aging for 12-20 hours, and then filtering a precipitate, washing the precipitate and drying the precipitate;

6) uniformly mixing the precipitate with a lithium salt, presintering the mixture at a temperature of 450-550° C. for 3-5 hours, and then calcining the mixture at a temperature of 750-950° C. for 10-16 hours to obtain a pure-phase layered lithium-rich manganese-based cathode material; wherein a molar ratio of the precipitate to the lithium salt is 1:(1.05-1.1);

7) totally dissolving a lithium source, a transition metal source, a phosphorus source and an additive in the deionized water at a molar ratio of 1:1:1:(1-5), and then adding the pure-phase layered lithium-rich manganese-based cathode material obtained in step 6), and slowly evaporating to dry at a temperature of 80-100° C. to form a gel; and 8) vacuum drying the gel obtained in step 7) at a temperature of 100-120° C., crushing the gel, and precalcining the gel at a temperature of 400-600° C. for 4-6 hours to obtain the layered lithium-rich manganese-based cathode material with olivine structured $LiMPO_4$ surface modification.

Further, in step 1), the nickel salt is one or more of nickel sulfate, nickel nitrate and nickel acetate; the cobalt salt is one or more of cobalt sulfate, cobalt nitrate and cobalt acetate; the manganese salt is one or more of manganese sulfate, manganese nitrate and manganese acetate.

Further, in step 2), the alkali is one or more of a sodium hydroxide solution and a potassium hydroxide solution, and has a concentration of 2-5 mol/L; wherein a molar ratio of sodium hydroxide to the ammonia water is 2:1.

Further, in step 6), the lithium salt is one or more of lithium hydroxide, lithium carbonate and lithium acetate.

Further, in step 6), the temperature is raised to 450-550° C. at a heating rate of 5° C./min and is maintained for 3 to 5 hours; and then the temperature is raised to 750-950° C. at a heating rate of 1-5° C./min and is maintained for 10-16 hours.

Further, in step 7), the lithium source is one or more of lithium hydroxide, lithium dihydrogen phosphate and lithium carbonate.

Further, in step 7), the transition metal source is one or more of ferrous sulfate, ferrous nitrate, ferrous oxalate and ferrous acetate.

Further, in step 7), the phosphorus source is one or more of ammonium dihydrogen phosphate, ammonium hydrogen phosphate and phosphoric acid; and the additive is one or more of citric acid, tartaric acid, glucose and sucrose, and an amount of the additive is controlled to be 20-50% of the mass of the transition metal source.

Further, in step 8), the temperature is raised to 400-600° C. at a heating rate of 1-5° C./min and is maintained for 4-6 hours.

A layered lithium-rich manganese-based cathode material with olivine structured $LiMPO_4$ surface modification obtainable by using the preparation method as described above is provided, wherein the layered lithium-rich manganese-based cathode material has a chemical formula of $Li_{1.2}Mn_xNi_yCo_{0.8-x-y}O_2$, where x and y are moles, $0.4 \leq x \leq 0.6$ and $0.1 \leq y \leq 0.2$; an olivine structured $LiMPO_4$ coating layer of the layered lithium-rich manganese-based cathode material is $LiNiPO_4$, $LiCoPO_4$, $LiMnPO_4$, $LiFePO_4$, $LiCuPO_4$, $LiAlPO_4$, $LiMoPO_4$ or $LiMgPO_4$, and a mass of the olivine structured $LiMPO_4$ coating layer is controlled to be 1-10% of the mass of the layered lithium-rich manganese-based cathode material.

As compared with the prior art, the present invention has the following advantages and achieves the following beneficial effects:

1. The preparation method according to the present invention is simple and environmentally friendly, has a low cost and is thus suitable for large-scale industrial production.

2. According to the present invention, the surface of the layered lithium-rich manganese-based cathode material is modified by using the olivine structured $LiMPO_4$, such that cycle stability thereof is effectively improved, and voltage drop generated by the material in the cycle course is inhibited.

DETAILED DESCRIPTION OF THE PREFERRED EMBODIMENT

The present invention is described in detail by using a layered lithium-rich manganese-based cathode material whose surface is coated by $LiFePO_4$ as specific examples. However, the present invention is not limited to these examples.

Example 1

1. 2 mol of manganese sulfate, 0.48 mol of cobalt sulfate and 0.48 mol of nickel sulfate were respectively weighed based on a molar ratio of Mn:Ni:Co=0.54:0.13:0.13 in a chemical formula of $Li_{1.2}Mn_{0.54}Ni_{0.13}Co_{0.13}O_2$ of a layered lithium-rich manganese-based cathode material, and were dissolved in deionized water to formulate salt solutions having a concentration of 0.5 mol/L.

2. 5.92 mol of NaOH solution and 3 mol of ammonia water were dissolved in the deionized water to formulate a mixed alkali solution, wherein the NaOH solution had a concentration of 2 mol/L and the ammonia water had a concentration of 2 mol/L.

3. The mixed alkali solution was added into a reactor, wherein a volume of the mixed alkali solution accounted for 30% of the volume of the reactor, a pH value was controlled to be 9, and a temperature was controlled to be 60° C.

4. The solutions of the nickel salt, the cobalt salt and the manganese salt formulated in step 1 were respectively added into the reactor via a peristaltic pump at a constant speed, wherein during the entire process, the pH value was controlled to be 9, and the temperature was controlled to be 60° C.

5. Upon adding the solutions of the nickel salt, the cobalt salt and the manganese salt, standing still and aging was carried out for 12 hours, and then a precipitate was filtered, washed and dried.

6. The precipitate was uniformly mixed with 4.67 mol of lithium carbonate (a molar ratio of the precipitate to the lithium salt was 1:1.05), after the temperature was raised to 450° C. at a heating rate of 1° C./min and the mixture was presintered for 5 hours, the temperature was raised to 750° C. at a heating rate of 1° C./min and the mixture was calcined for 16 hours to obtain a pure-phase layered lithium-rich manganese-based cathode material.

7. 0.101 mol of lithium carbonate, 0.101 mol of ferrous oxalate, 0.101 mol of ammonium dihydrogen phosphate and 0.101 mol of citric acid were totally dissolved in the deionized water, and the prepared layered lithium-rich manganese-based cathode material was added and slowly evaporated to dry at 80° C. to form a gel.

8. The obtained gel was vacuum dried at 100° C. and then crushed, the temperature was raised to 400° C. at a heating rate of 1° C./min and the gel was calcined for 6 hours to obtain a layered lithium-rich manganese-based cathode material with olivine structured $LiFePO_4$ surface modification.

Figure 1:
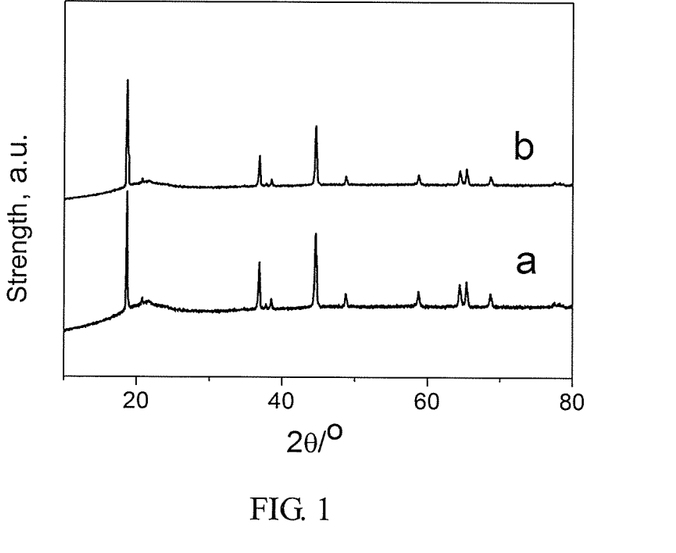
FIG. 1 illustrates XRD patterns of a layered lithium-rich manganese-based cathode material with $LiFePO_4$ surface modification and a pure-phase layered lithium-rich manganese-based cathode material (before surface modification) obtained in Example 1.
Figure 2:
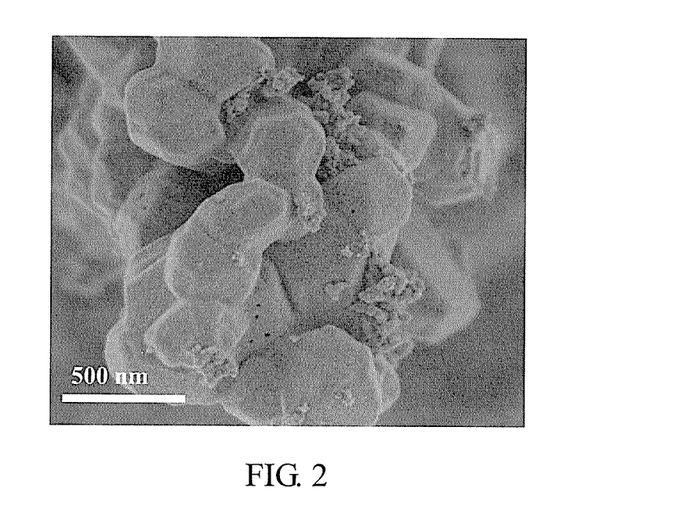
FIG. 2 illustrates a SEM image of the layered lithium-rich manganese-based cathode material with olivine structured $LiFePO_4$ surface modification obtained in Example 1 of the present invention.
Figure 3:
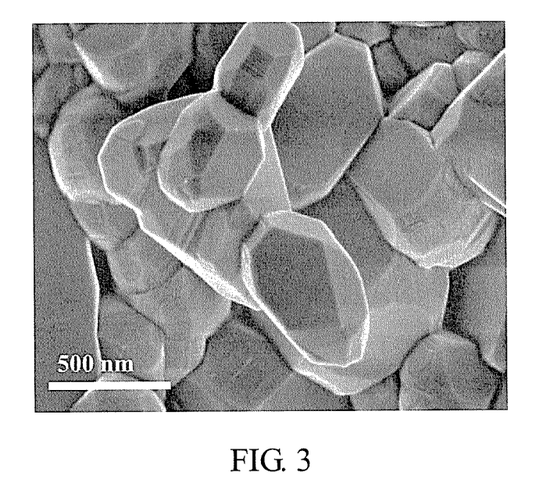
FIG. 3 illustrates a SEM image of the pure-phase layered lithium-rich manganese-based cathode material (before surface modification) used in Example 1.

In FIG. 1, a represents an XRD pattern of the layered lithium-rich manganese-based cathode material with $LiFePO_4$ surface modification obtained in Example 1, and b represents an XRD pattern of the pure-phase layered lithium-rich manganese-based cathode material obtained in Example 1. As seen from FIG. 1, the layered lithium-rich manganese-based cathode material with $LiFePO_4$ surface modification is substantially consistent with the pure-phase layered lithium-rich manganese-based cathode material before modification. That is, $LiFePO_4$ coating fails to cause the structure of the layered lithium-rich manganese-based cathode material to change. FIG. 2 and FIG. 3 illustrate SEM images of the layered lithium-rich manganese-based cathode material with $LiFePO_4$ surface modification and the layered lithium-rich manganese-based cathode material (before modification by coating) obtained in Example 1. Through a comparison between FIG. 2 and FIG. 3, nano-scale $LiFePO_4$ is uniformly coated on the surface of particles of the layered lithium-rich manganese-based cathode material.

After the layered lithium-rich manganese-based cathode material with $LiFePO_4$ surface modification (or the pure-phase layered lithium-rich manganese-based cathode material) obtained in Example 1 was mixed with a conductive carbon black super P and a bonding agent PVDF at a mass ratio of 8:1:1, 0.4 g of N-methylpyrrolidone was added and stirred uniformly, an obtained slurry was coated on an aluminum foil of a current collector and dried at 120° C. to obtain a cathode tab, a tab of metal lithium was used as an anode, polypropylene was used as a membrane and LiPF6 was used as an electrolyte, and finally a CR2032 button-type experimental battery was assembled in a glove box filled with argon gas. The assembled experimental battery was made to undergo a charge and discharge test at a magnification of 0.5 C, and cycle curves obtained are illustrated in FIG. 4.

Figure 4:
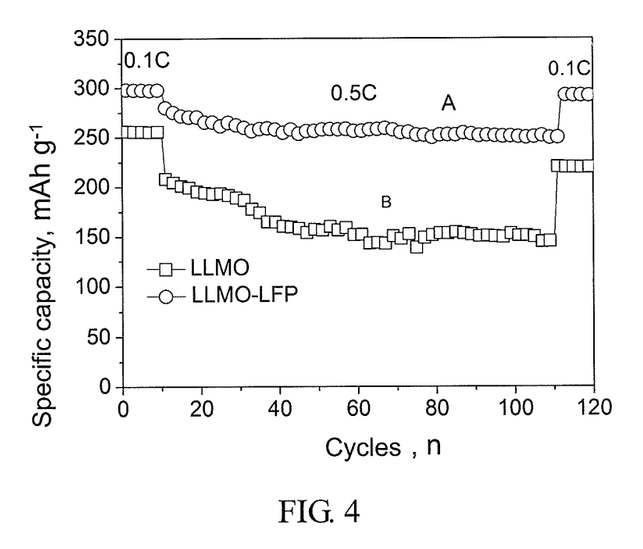
FIG. 4 illustrates discharge cycle curves of a layered manganese-based cathode material with surface modification by a $LiFePO_4$ coating layer and the pure-phase layered lithium-rich manganese-based cathode material obtained in Example 1 at a 0.5 C current density.
Figure 5:
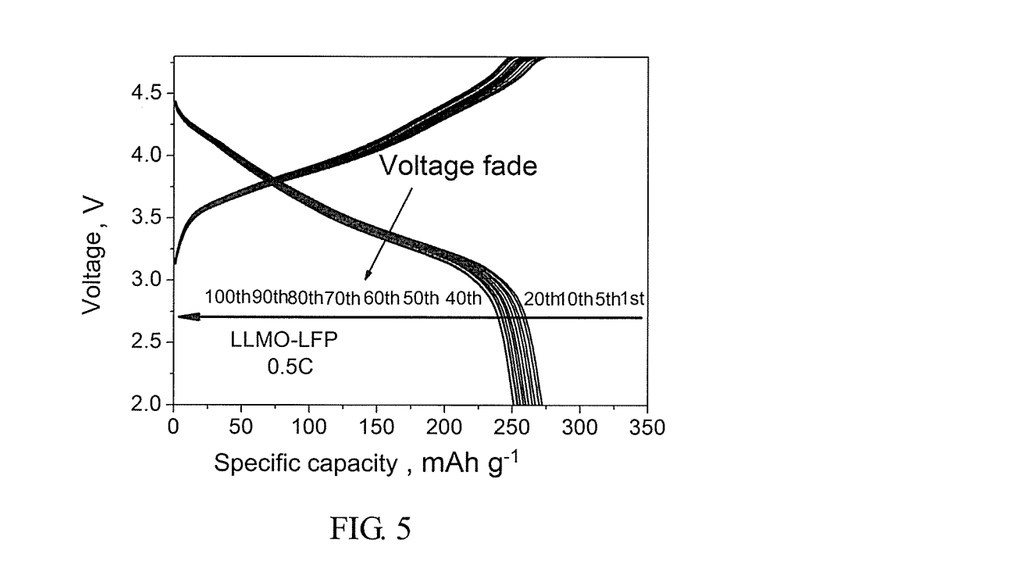
FIG. 5 illustrates charge and discharge curves of the layered lithium-rich manganese-based cathode material with $LiFePO_4$ surface modification obtained in Example 1 in the first 100 runs in a charge and discharge course.
Figure 6:
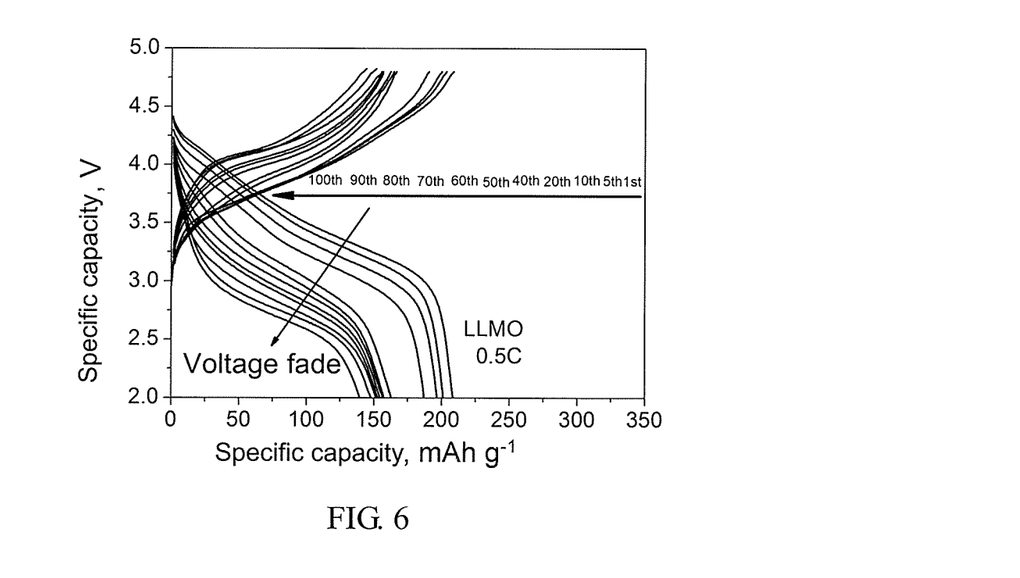
FIG. 6 illustrates charge and discharge curves of the pure-phase layered lithium-rich manganese-based cathode material obtained in Example 1 in the first 100 runs in a charge and discharge course.

In FIG. 4, A and B respectively represent cycle curves of the layered lithium-rich manganese-based cathode material with $LiFePO_4$ surface modification and the pure-phase layered lithium-rich manganese-based cathode material obtained in Example 1 at a 0.5 C current density. As seen from A of FIG. 4 FIG. 4A, an initial discharge specific capacity of the layered lithium-rich manganese-based cathode material with $LiFePO_4$ surface modification obtained in Example 1 is 280 mAh/g, upon 100 cycles, the discharge specific capacity thereof is 249.8 mAh/g, and a cycle maintenance rate is about 89.2%. As seen from B of FIG. 4, an initial discharge specific capacity of the pure-phase layered lithium-rich manganese-based cathode material obtained in Example 1 is 208.3 mAh/g, upon 100 cycles, the discharge specific capacity thereof is 143.1 mAh/g, and a cycle maintenance rate is only 68.7%. In addition, as seen from FIG. 5 and FIG. 6, the layered lithium-rich manganese-based cathode material with $LiFePO_4$ surface modification generates a smaller voltage drop, whereas the pure-phase layered lithium-rich manganese-based cathode material generates a greater voltage drop. As seen from the above results, the layered lithium-rich manganese-based cathode material with nano-scale $LiFePO_4$ surface modification has a stable structure, a high specific capacity and a good cycle stability, and is capable of effectively inhibiting the voltage drop generated by the layered lithium-rich manganese-based cathode material in the charge and discharge course.

Example 2

1. 3 mol of manganese nitrate, 0.72 mol of cobalt nitrate and 0.72 mol of nickel nitrate were respectively weighed based on a molar ratio of Mn:Ni:Co=0.54:0.13:0.13 in a chemical formula of $Li_{1.2}Mn_{0.5}Ni_{0.15}Co_{0.15}O_2$ of a layered lithium-rich manganese-based cathode material, and were dissolved in deionized water to formulate salt solutions having a concentration of 2 mol/L.

2. 2.65 mol of NaOH solution and 1.3 mol of ammonia water were dissolved in the deionized water to formulate a mixed alkali solution, wherein the NaOH solution had a concentration of 10 mol/L and the ammonia water had a concentration of 5 mol/L.

3. The mixed alkali solution was added into a reactor, wherein a volume of the mixed alkali solution accounted for 50% of the volume of the reactor, a pH value was controlled to be 12, and a temperature was controlled to be 80° C.

4. The solutions of the nickel salt, the cobalt salt and the manganese salt formulated in step 1 were respectively added into the reactor via a peristaltic pump at a constant speed, wherein during the entire process, the pH value was controlled to be 12, and the temperature was controlled to be 80° C.

5. Upon adding the solutions of the nickel salt, the cobalt salt and the manganese salt, standing still and aging was carried out for 20 hours, and then a precipitate was filtered, washed and dried.

6. The precipitate was uniformly mixed with 7 mol of lithium hydroxide (a molar ratio of the precipitate to the lithium salt was 1:1.1), after the temperature was raised to 550° C. at a heating rate of 5° C./min and the mixture was presintered for 4 hours, the temperature was raised to 850° C. at a heating rate of 5° C./min and the mixture was calcined for 13 hours to obtain a pure-phase layered lithium-rich manganese-based cathode material.

7. 0.202 mol of lithium carbonate, 0.202 mol of ferrous nitrate, 0.202 mol of ammonium dihydrogen phosphate and 1.01 mol of tartaric acid were totally dissolved in the deionized water, and the prepared layered lithium-rich manganese-based cathode material was added and slowly evaporated to dry at 100° C. to form a gel.

8. The obtained gel was vacuum dried at 120° C. and then crushed, and the temperature was raised to 600° C. at a heating rate of 5° C./min and the gel was calcined for 4 hours to obtain a layered lithium-rich manganese-based cathode material with olivine structured $LiFePO_4$ surface modification.

Preparation and analysis of electrochemical properties of the layered lithium-rich manganese-based cathode material with olivine structured $LiFePO_4$ surface modification obtained in Example 2 are as follows: 0.4 g of the obtained layered lithium-rich manganese-based cathode material whose surface is modified by $LiFePO_4$ was weighed, 0.05 g of an acetylene black was added as a conductive agent and 0.05 g of PVDF (HSV900) was added as a bonding agent, such mixture was sufficiently ground, 0.4 g of NMP was added for dispersion and mixture, a slurry was uniformly formulated and then coated on a copper foil to lead the slurry to prepare a tab, after drying, a tab of metal sodium was used as a counter electrode in an anaerobic glove box, and finally a CR2025 button-type battery was obtained via assembling. At 25° C., in a test of 100 charge and discharge cycles between 2-4.8 V at 500 mA/g, the layered lithium-rich manganese-based cathode material with nano-scale $LiFePO_4$ surface modification has a stable structure, a high specific capacity and a good cycle stability, and is capable of effectively inhibiting the voltage drop generated by the layered lithium-rich manganese-based cathode material in the charge and discharge course, and exhibits excellent electrochemical properties.

Example 3

1. 1.85 mol of manganese acetate, 0.45 mol of cobalt acetate and 0.45 mol of nickel acetate were respectively weighed based on a molar ratio of Mn:Ni:Co=0.54:0.13:0.13 in a chemical formula of $Li_{1.2}Mn_{0.52}Ni_{0.14}Co_{0.14}O_2$ of a layered lithium-rich manganese-based cathode material, and were dissolved in deionized water to formulate salt solutions having a concentration of 1.2 mol/L.

2. 4.15 mol of NaOH solution and 2.12 mol of ammonia water were dissolved in the deionized water to formulate a mixed alkali solution, wherein the NaOH solution had a concentration of 6 mol/L and the ammonia water had a concentration of 3.5 mol/L.

3. The mixed alkali solution was added into a reactor, wherein a volume of the mixed alkali solution accounted for 40% of the volume of the reactor, a pH value was controlled to be 10, and a temperature was controlled to be 70° C.

4. The solutions of the nickel salt, the cobalt salt and the manganese salt formulated in step 1 were respectively added into the reactor via a peristaltic pump at a constant speed, wherein during the entire process, the pH value was controlled to be 9.5, and the temperature was controlled to be 75° C.

5. Upon adding the solutions of the nickel salt, the cobalt salt and the manganese salt, standing still and aging was carried out for 16 hours, and then a precipitate was filtered, washed and dried.

6. The precipitate was uniformly mixed with 4.4 mol of lithium acetate (a molar ratio of the precipitate to the lithium salt was 1:1.07), after the temperature was raised to 500° C. at a heating rate of 3.5° C./min and the mixture was presintered for 4 hours, the temperature was raised to 850° C. at a heating rate of 3.5° C./min and the mixture was calcined for 13 hours to obtain a pure-phase layered lithium-rich manganese-based cathode material.

7. 0.141 mol of lithium carbonate, 0.141 mol of ferrous sulfate, 0.141 mol of ammonium dihydrogen phosphate and 0.423 mol of tartaric acid were totally dissolved in the deionized water, and the prepared layered lithium-rich manganese-based cathode material was added and slowly evaporated to dry at 80° C. to form a gel.

8. The obtained gel was vacuum dried at 110° C. and then crushed, and the temperature was raised to 500° C. at a heating rate of 3.5° C./min and the gel was calcined for 5 hours to obtain a layered lithium-rich manganese-based cathode material with olivine structured $LiFePO_4$ surface modification.

Preparation and analysis of electrochemical properties of the layered lithium-rich manganese-based cathode material with olivine structured $LiFePO_4$ surface modification obtained in Example 3 are as follows: 0.4 g of the obtained layered lithium-rich manganese-based cathode material whose surface is modified by $LiFePO_4$ was weighed, 0.05 g of an acetylene black was added as a conductive agent and 0.05 g of PVDF (HSV900) was added as a bonding agent, such mixture was sufficiently ground, 0.4 g of NMP was added for dispersion and mixture, a slurry was uniformly formulated and then coated on a copper foil to lead the slurry to prepare a tab, after drying, a tab of metal sodium was used as a counter electrode in an anaerobic glove box, and finally a CR2025 button-type battery was obtained via assembling. At 25° C., in a test of 100 charge and discharge cycles between 2-4.8 V at 500 mA/g, the layered lithium-rich manganese-based cathode material with nano-scale $LiFePO_4$ surface modification has a stable structure, a high specific capacity and a good cycle stability, and is capable of effectively inhibiting the voltage drop generated by the layered lithium-rich manganese-based cathode material in the charge and discharge course, and exhibits excellent electrochemical properties.

Example 4

1. 2 mol of manganese sulfate, 0.33 mol of cobalt sulfate and 0.33 mol of nickel sulfate were respectively weighed based on a molar ratio of Mn:Ni:Co=0.6:0.1:0.1 in a chemical formula of $Li_{1.2}Mn_{0.6}Ni_{0.1}Co_{0.1}O_2$ of a layered lithium-rich manganese-based cathode material, and were dissolved in deionized water to formulate salt solutions having a concentration of 1 mol/L.

2. 7.15 mol of NaOH solution and 1.5 mol of ammonia water were dissolved in the deionized water to formulate a mixed alkali solution, wherein the NaOH solution had a concentration of 3 mol/L and the ammonia water had a concentration of 4 mol/L.

3. The mixed alkali solution was added into a reactor, wherein a volume of the mixed alkali solution accounted for 35% of the volume of the reactor, a pH value was controlled to be 10, and a temperature was controlled to be 65° C.

4. The solutions of the nickel salt, the cobalt salt and the manganese salt formulated in step 1 were respectively added into the reactor via a peristaltic pump at a constant speed, wherein during the entire process, the pH value was controlled to be 10, and the temperature was controlled to be 65° C.

5. Upon adding the solutions of the nickel salt, the cobalt salt and the manganese salt, standing still and aging was carried out for 16 hours, and then a precipitate was filtered, washed and dried.

6. The precipitate was uniformly mixed, through grinding, with 4.24 mol of lithium carbonate (a molar ratio of the precipitate to the lithium salt was 1:1.06), after the temperature was raised to 450° C. at a heating rate of 1° C./min and the mixture was presintered for 4.5 hours, the temperature was raised to 750° C. at a heating rate of 1° C./min and the mixture was calcined for 11 hours to obtain a pure-phase layered lithium-rich manganese-based cathode material.

7. 0.141 mol of lithium carbonate, 0.141 mol of ferrous oxalate, 0.141 mol of ammonium dihydrogen phosphate and 0.423 mol of tartaric acid were totally dissolved in the deionized water, and the prepared layered lithium-rich manganese-based cathode material was added and was slowly evaporated to dry at 80° C. to form a gel.

8. The obtained gel was vacuum dried at 120° C. and then crushed, and the temperature was raised to 600° C. at a heating rate of 5° C./min and the gel was calcined for 4.5 hours to obtain a layered lithium-rich manganese-based cathode material whose surface is coated by olivine structured $LiMPO_4$.

Preparation and analysis of electrochemical properties of the layered lithium-rich manganese-based cathode material with olivine structured $LiFePO_4$ modified surface obtained in Example 4 are as follows: 0.4 g of the obtained layered lithium-rich manganese-based cathode material with $LiFePO_4$ surface modification was weighed, 0.05 g of an acetylene black was added as a conductive agent and 0.05 g of PVDF (HSV900) was added as a bonding agent, such mixture was sufficiently ground, 0.4 g of NMP was added for dispersion and mixture, a slurry was uniformly formulated and then coated on a copper foil to lead the slurry to prepare a tab, after drying, a tab of metal sodium was used as a counter electrode in an anaerobic glove box, and finally a CR2025 button-type battery was obtained via assembling. At 25° C., in a test of 100 charge and discharge cycles between 2-4.8 V at 500 mA/g, the layered lithium-rich manganese-based cathode material with nano-scale $LiFePO_4$ surface modification has a stable structure, a high specific capacity and a good cycle stability, and is capable of effectively inhibiting the voltage drop generated by the layered lithium-rich manganese-based cathode material in the charge and discharge course, and exhibits excellent electrochemical properties.

Example 5

1. 3 mol of manganese nitrate, 1 mol of cobalt nitrate and 1 mol of nickel nitrate were respectively weighed based on a molar ratio of Mn:Ni:Co=0.48:0.16:0.16 in a chemical formula of $Li_{1.2}Mn_{0.48}Ni_{0.16}Co_{0.16}O_2$ of a layered lithium-rich manganese-based cathode material, and were dissolved in deionized water to formulate salt solutions having a concentration of 1 mol/L.

2. 6.65 mol of NaOH solution and 1.13 mol of ammonia water were dissolved in the deionized water to formulate a mixed alkali solution, wherein the NaOH solution had a concentration of 3.5 mol/L and the ammonia water had a concentration of 4.5 mol/L.

3. The mixed alkali solution was added into a reactor, wherein a volume of the mixed alkali solution accounted for 45% of the volume of the reactor, a pH value was controlled to be 11, and a temperature was controlled to be 75° C.

4. The solutions of the nickel salt, the cobalt salt and the manganese salt formulated in step 1 were respectively added into the reactor via a peristaltic pump at a constant speed, wherein during the entire process, the pH value was controlled to be 11, and the temperature was controlled to be 75° C.

5. Upon adding the solutions of the nickel salt, the cobalt salt and the manganese salt, standing still and aging was carried out for 11 hours, and then a precipitate was filtered, washed and dried.

6. The precipitate was uniformly mixed with 8.18 mol of lithium hydroxide (a molar ratio of the precipitate to the lithium salt was 1:1.08), after the temperature was raised to 550° C. at a heating rate of 5° C./min and the mixture was presintered for 6 hours, the temperature was raised to 750° C. at a heating rate of 1° C./min and the mixture was calcined for 11 hours to obtain a pure-phase layered lithium-rich manganese-based cathode material.

7. 0.202 mol of lithium carbonate, 0.202 mol of ferrous sulfate, 0.202 mol of ammonium dihydrogen phosphate and 1.01 mol of tartaric acid were totally dissolved in the deionized water, and then the prepared layered lithium-rich manganese-based cathode material was added and slowly evaporated to dry at 80° C. to form a gel.

8. The obtained gel was vacuum dried at 120° C. and then crushed, and the temperature was raised to 600° C. at a heating rate of 5° C./min and the gel was calcined for 4 hours to obtain a layered lithium-rich manganese-based cathode material with olivine structured $LiMPO_4$ surface modification.

Preparation and analysis of electrochemical properties of the layered lithium-rich manganese-based cathode material with olivine structured $LiFePO_4$ surface modification obtained in Example 5 are as follows: 0.4 g of the obtained layered lithium-rich manganese-based cathode material with $LiFePO_4$ surface modification was weighed, 0.05 g of an acetylene black was added as a conductive agent and 0.05 g of PVDF (HSV900) was added as a bonding agent, such mixture was sufficiently ground, 0.4 g of NMP was added for dispersion and mixture, a slurry was uniformly formulated and then coated on a copper foil to lead the slurry to prepare a tab, after drying, a tab of metal sodium was used as a counter electrode in an anaerobic glove box, and finally a CR2025 button-type battery was obtained via assembling. At 25° C., in a test of 100 charge and discharge cycles between 2-4.8 V at 500 mA/g, the layered lithium-rich manganese-based cathode material with nano-scale $LiFePO_4$ surface modification has a stable structure, a high specific capacity and a good cycle stability, and is capable of effectively inhibiting the voltage drop generated by the layered lithium-rich manganese-based cathode material in the charge and discharge course, and exhibits excellent electrochemical properties.

What is claimed is:

1. A preparation method of a layered lithium-rich manganese-based cathode material with olivine structured $LiMPO_4$ surface modification, comprising steps of:
1) weighing a nickel salt, a cobalt salt and a manganese salt and dissolving the nickel salt, the cobalt salt and the manganese salt in deionized water respectively to formulate salt solutions of each having a concentration of 0.5-2 mol/L, wherein the nickel salt, the cobalt salt and the manganese salt are weighed based on a molar ratio of Ni, Co and Mn in a chemical formula of $Li_{1.2}Mn_xNi_yCo_{0.8-x-y}O_2$, where $0.4 \leq x \leq 0.6$, $0.1 \leq y \leq 0.2$;
2) dissolving alkali and ammonia water in the deionized water to formulate a mixed alkali solution, wherein a concentration of the alkali is 2-10 mol/L, and a molar concentration of the ammonia water is 2-5 mol/L;

3) adding the mixed alkali solution obtained in step 2) into a reactor, wherein a volume of the mixed alkali solution accounts for 30% to 50% of a volume of the reactor, and controlling a pH value between 9 and 12, and controlling a temperature between 60° C. and 80° C.;

4) respectively adding the salt solutions of the nickel salt, the cobalt salt and the manganese salt formulated in step 1) into the reactor via a peristaltic pump at a constant speed, wherein in step 4), the pH value is between 9 and 12, and the temperature is between 60° C. and 80° C.;

5) after finished adding the salt solutions of the nickel salt, the cobalt salt and the manganese salt, standing still and aging for 12-20 hours, followed by filtering a precipitate, washing the precipitate and drying the precipitate;

6) uniformly mixing the precipitate with a lithium salt, presintering a mixture of the precipitate and the lithium salt at a presintering temperature of 450-550° C. for 3-5 hours, and then calcining the mixture of the precipitate and the lithium salt at a calcining temperature of 750-950° C. for 10-16 hours to obtain a pure-phase layered lithium-rich manganese-based cathode material; wherein a molar ratio of the precipitate to the lithium salt is 1:(1.05-1.1);

7) totally dissolving a lithium source, a transition metal source, a phosphorus source and an additive in the deionized water at a molar ratio of 1:1:1:(1-5), followed by adding the pure-phase layered lithium-rich manganese-based cathode material obtained in step 6), evaporating to dry at an evaporating temperature of 80-100° C. to form a gel; and 8) vacuum drying the gel obtained in step 7) at a vacuum drying temperature of 100-120° C., crushing the gel, and precalcining the gel at a precalcining temperature of 400 600° C. for 4-6 hours to obtain the layered lithium-rich manganese-based cathode material with olivine structured $LiMPO_4$ surface modification.

2. The preparation method according to claim 1, wherein in step 1), the nickel salt is one or more of nickel sulfate, nickel nitrate and nickel acetate; the cobalt salt is one or more of cobalt sulfate, cobalt nitrate and cobalt acetate; the manganese salt is one or more of manganese sulfate, manganese nitrate and manganese acetate.

3. The preparation method according to claim 1, wherein in step 2), the alkali is one or more of a sodium hydroxide solution and a potassium hydroxide solution, and the concentration of the alkali is 2-5 mol/L; a molar ratio of sodium hydroxide to the ammonia water is 2:1.

4. The preparation method according to claim 1, wherein in step 6), the lithium salt is one or more of lithium hydroxide, lithium carbonate and lithium acetate.

5. The preparation method according to claim 1, wherein in step 6), the presintering temperature is raised to 450 550° C. at a heating rate of 1-5° C./min and is maintained for 3-5 hours; and then the calcining temperature is raised to 750-950° C. at the heating rate of 1-5° C./min and is maintained for 10-16 hours.

6. The preparation method according to claim 1, wherein in step 7), the lithium source is one or more of lithium hydroxide, lithium dihydrogen phosphate and lithium carbonate.

7. The preparation method according to claim 1, wherein in step 7), the transition metal source is one or more of ferrous sulfate, ferrous nitrate, ferrous oxalate and ferrous acetate.

8. The preparation method according to claim 1, wherein in step 7), the phosphorus source is one or more of ammonium dihydrogen phosphate, ammonium hydrogen phosphate and phosphoric acid; and the additive is one or more of citric acid, tartaric acid, glucose and sucrose, and an amount of the additive is controlled to be 20-50% of a mass of the transition metal source.

9. The preparation method according to claim 1, wherein in step 8), the precalcining temperature is raised to 400° C. to 600° C. at a heating rate of 1-5° C./min and is maintained for 4-6 hours.

10. A layered lithium-rich manganese-based cathode material with olivine structured $LiMPO_4$ surface modification obtained by using a preparation method according to claim 1, wherein the layered lithium-rich manganese-based cathode material has a chemical formula of $Li_{1.2}Mn_xNi_yCo_{0.8-x-y}O_2$, wherein x and y are moles, $0.4 \leq x \leq 0.6$ and $0.1 \leq y \leq 0.2$; an olivine structured $LiMPO_4$ coating layer of the layered lithium-rich manganese-based cathode material is $LiNiPO_4$, $LiCoPO_4$, $LiMnPO_4$, $LiFePO_4$, $LiCuPO_4$, $LiAlPO_4$, $LiMoPO_4$ or $LiMgPO_4$, and a mass of the olivine structured $LiMPO_4$ coating layer is controlled to be 1-10% of a mass of the layered lithium-rich manganese-based cathode material.

11. A layered lithium-rich manganese-based cathode material with olivine structured $LiMPO_4$ surface modification obtained by using a preparation method according to claim 2, wherein the layered lithium-rich manganese-based cathode material has a chemical formula of $Li_{1.2}Mn_xNi_yCo_{0.8-x-y}O_2$, wherein x and y are moles, $0.4 \leq x \leq 0.6$ and $0.1 \leq y \leq 0.2$; an olivine structured $LiMPO_4$ coating layer of the layered lithium-rich manganese-based cathode material is $LiNiPO_4$, $LiCoPO_4$, $LiMnPO_4$, $LiFePO_4$, $LiCuPO_4$, $LiAlPO_4$, $LiMoPO_4$ or $LiMgPO_4$, and a mass of the olivine structured $LiMPO_4$ coating layer is controlled to be 1-10% of a mass of the layered lithium-rich manganese-based cathode material.

12. A layered lithium-rich manganese-based cathode material with olivine structured $LiMPO_4$ surface modification obtained by using a preparation method according to claim 3, wherein the layered lithium-rich manganese-based cathode material has a chemical formula of $Li_{1.2}Mn_xNi_yCo_{0.8-x-y}O_2$, wherein x and y are moles, $0.4 \leq x \leq 0.6$ and $0.1 \leq y \leq 0.2$; an olivine structured $LiMPO_4$ coating layer of the layered lithium-rich manganese-based cathode material is $LiNiPO_4$, $LiCoPO_4$, $LiMnPO_4$, $LiFePO_4$, $LiCuPO_4$, $LiAlPO_4$, $LiMoPO_4$ or $LiMgPO_4$, and a mass of the olivine structured $LiMPO_4$ coating layer is controlled to be 1-10% of a mass of the layered lithium-rich manganese-based cathode material.

13. A layered lithium-rich manganese-based cathode material with olivine structured $LiMPO_4$ surface modification obtained by using a preparation method according to claim 4, wherein the layered lithium-rich manganese-based cathode material has a chemical formula of $Li_{1.2}Mn_xNi_yCo^{0.8-x-y}O_2$, wherein x and y are moles, $0.4 \leq x \leq 0.6$ and $0.1 \leq y \leq 0.2$; an olivine structured $LiMPO_4$ coating layer of the layered lithium-rich manganese-based cathode material is $LiNiPO_4$, $LiCoPO_4$, $LiMnPO_4$, $LiFePO_4$, $LiCuPO_4$, $LiAlPO_4$, $LiMoPO_4$ or $LiMgPO_4$, and a mass of the olivine structured $LiMPO_4$ coating layer is controlled to be 1-10% of a mass of the layered lithium-rich manganese-based cathode material.

14. A layered lithium-rich manganese-based cathode material with olivine structured $LiMPO_4$ surface modification obtained by using a preparation method according to claim 5, wherein the layered lithium-rich manganese-based cathode material has a chemical formula of $Li_{1.2}Mn_xNi_yCo_{0.8-x-y}O_2$, wherein x and y are moles, $0.4 \leq x \leq 0.6$ and $0.1 \leq y \leq 0.2$; an olivine structured $LiMPO_4$ coating layer of the layered lithium-rich manganese-based cathode material is $LiNiPO_4$, $LiCoPO_4$, $LiMnPO_4$, $LiFePO_4$, $LiCuPO_4$, $LiAlPO_4$, $LiMoPO_4$ or $LiMgPO_4$, and a mass of the olivine structured $LiMPO_4$ coating layer is controlled to be 1-10% of a mass of the layered lithium-rich manganese-based cathode material.

15. A layered lithium-rich manganese-based cathode material with olivine structured $LiMPO_4$ surface modification obtained by using a preparation method according to claim 6, wherein the layered lithium-rich manganese-based cathode material has a chemical formula of $Li_{1.2}Mn_xNi_yCo_{0.8-x-y}O_2$, wherein x and y are moles, $0.4 \leq x \leq 0.6$ and $0.1 \leq y \leq 0.2$; an olivine structured $LiMPO_4$ coating layer of the layered lithium-rich manganese-based cathode material is $LiNiPO_4$, $LiCoPO_4$, $LiMnPO_4$, $LiFePO_4$, $LiCuPO_4$, $LiAlPO_4$, $LiMoPO_4$ or $LiMgPO_4$, and a mass of the olivine structured $LiMPO_4$ coating layer is controlled to be 1-10% of a mass of the layered lithium-rich manganese-based cathode material.

16. A layered lithium-rich manganese-based cathode material with olivine structured $LiMPO_4$ surface modification obtained by using a preparation method according to claim 7, wherein the layered lithium-rich manganese-based cathode material has a chemical formula of $Li_{1.2}Mn_xNi_yCo_{0.8-x-y}O_2$, wherein x and y are moles, $0.4 \leq x \leq 0.6$ and $0.1 \leq y \leq 0.2$; an olivine structured $LiMPO_4$ coating layer of the layered lithium-rich manganese-based cathode material is $LiNiPO_4$, $LiCoPO_4$, $LiMnPO_4$, $LiFePO_4$, $LiCuPO_4$, $LiAlPO_4$, $LiMoPO_4$ or $LiMgPO_4$, and a mass of the olivine structured $LiMPO_4$ coating layer is controlled to be 1-10% of a mass of the layered lithium-rich manganese-based cathode material.

17. A layered lithium-rich manganese-based cathode material with olivine structured $LiMPO_4$ surface modification obtained by using a preparation method according to claim 8, wherein the layered lithium-rich manganese-based cathode material has a chemical formula of $Li_{1.2}Mn_xNi_yCo^{0.8-x-y}O_2$, wherein x and y are moles, $0.4 \leq x \leq 0.6$ and $0.1 \leq y \leq 0.2$; an olivine structured $LiMPO_4$ coating layer of the layered lithium-rich manganese-based cathode material is $LiNiPO_4$, $LiCoPO_4$, $LiMnPO_4$, $LiFePO_4$, $LiCuPO_4$, $LiAlPO_4$, $LiMoPO_4$ or $LiMgPO_4$, and a mass of the olivine structured $LiMPO_4$ coating layer is controlled to be 1-10% of a mass of the layered lithium-rich manganese-based cathode material.

18. A layered lithium-rich manganese-based cathode material with olivine structured $LiMPO_4$ surface modification obtained by using a preparation method according to claim 9, wherein the layered lithium-rich manganese-based cathode material has a chemical formula of $Li_{1.2}Mn_xNi_yCo_{0.8-x-y}O_2$, wherein x and y are moles, $0.4 \leq x \leq 0.6$ and $0.1 \leq y \leq 0.2$; an olivine structured $LiMPO_4$ coating layer of the layered lithium-rich manganese-based cathode material is $LiNiPO_4$, $LiCoPO_4$, $LiMnPO_4$, $LiFePO_4$, $LiCuPO_4$, $LiAlPO_4$, $LiMoPO_4$ or $LiMgPO_4$, and a mass of the olivine structured $LiMPO_4$ coating layer is controlled to be 1-10% of a mass of the layered lithium-rich manganese-based cathode material.

* * * * *